United States Patent
Bolhaar et al.

(10) Patent No.: US 11,579,385 B2
(45) Date of Patent: Feb. 14, 2023

(54) MODAL CONDITIONER FOR USE WITH BEND-INSENSITIVE, MULTIMODE OPTICAL FIBERS

(71) Applicant: COMMSCOPE TECHNOLOGIES LLC, Hickory, NC (US)

(72) Inventors: Antonius Bernardus Gerardus Bolhaar, Ophemert (NL); Sander Johannes Floris, Lennisheuvel (NL); Gary Federico Gibbs, Wylie, TX (US); Bradley Scott Billman, Sachse, TX (US)

(73) Assignee: COMMSCOPE TECHNOLOGIES LLC, Hickory, NC (US)

( * ) Notice: Subject to any disclaimer, the term of this patent is extended or adjusted under 35 U.S.C. 154(b) by 0 days.

(21) Appl. No.: 17/047,159

(22) PCT Filed: Apr. 12, 2019

(86) PCT No.: PCT/US2019/027235
§ 371 (c)(1),
(2) Date: Oct. 13, 2020

(87) PCT Pub. No.: WO2019/200266
PCT Pub. Date: Oct. 17, 2019

(65) Prior Publication Data
US 2021/0124136 A1    Apr. 29, 2021

Related U.S. Application Data

(60) Provisional application No. 62/657,393, filed on Apr. 13, 2018.

(51) Int. Cl.
*G02B 6/42* (2006.01)
*G02B 6/028* (2006.01)
*G01M 11/00* (2006.01)

(52) U.S. Cl.
CPC ........... *G02B 6/4206* (2013.01); *G01M 11/33* (2013.01); *G02B 6/028* (2013.01)

(58) Field of Classification Search
CPC ...... G02B 6/4206; G02B 6/028; G02B 6/268; G02B 6/0288; G01M 11/33; G01M 11/088; H04B 10/0731
See application file for complete search history.

(56) References Cited

U.S. PATENT DOCUMENTS

| 9,036,137 B2 | 5/2015 | Goldstein et al. |
| 10,133,001 B2 * | 11/2018 | Bickham ............. G02B 6/4246 |

(Continued)

FOREIGN PATENT DOCUMENTS

| CN | 101634728 A | 1/2010 |
| CN | 105954011 A | 9/2016 |

(Continued)

OTHER PUBLICATIONS

International Search Report and Written Opinion of the International Searching Authority for International Patent Application No. PCT/US2019/027235 dated Aug. 5, 2019, 8 pages.

(Continued)

*Primary Examiner* — John Bedtelyon
(74) *Attorney, Agent, or Firm* — Merchant & Gould P.C.

(57) ABSTRACT

A light source unit generates an optical signal out of a bend-insensitive ("BI") optical fiber that is compliant with a desired encircled flux ("EF"). The unit includes a light source to generate an optical light signal and a conventional multimode optical fiber coupled to receive the optical light signal from the light source at a first end. A modal conditioner is arranged to condition the optical light signal propagating along different modes of the conventional multimode fiber. A first bend-insensitive (BI) multimode optical fiber has an input end, the input end of the first BI multimode (Continued)

optical fiber being coupled at a second end of the conventional multimode optical fiber to receive the conditioned optical light signal from the conventional multimode fiber. The output from the first BI multimode optical fiber outputs an optical signal having the desired EF.

15 Claims, 4 Drawing Sheets

(56) References Cited

U.S. PATENT DOCUMENTS

| | | |
|---|---|---|
| 2004/0227930 A1 | 11/2004 | Ingles, Jr. et al. |
| 2011/0096563 A1 | 4/2011 | Levin et al. |
| 2015/0086161 A1 | 3/2015 | Bickham et al. |
| 2015/0333830 A1 | 11/2015 | Chen et al. |
| 2016/0202418 A1 | 7/2016 | Fortin et al. |
| 2016/0218802 A1 | 7/2016 | Ruchet et al. |

FOREIGN PATENT DOCUMENTS

| | | |
|---|---|---|
| CN | 106383379 A | 2/2017 |
| EP | 3 108 275 B1 | 12/2021 |
| WO | 2010/036684 A2 | 4/2010 |

OTHER PUBLICATIONS

Extended European Search Report for European Patent Application No. 19784279.2 dated Dec. 2, 2021, 10 pages.

Office Action for Chinese Patent Application No. 201980023398.1 dated Mar. 7, 2022, 19 pages (includes English translation of Office Action).

Office Action for Indian Patent Application No. 202027042431 dated Aug. 1, 2022, 5 pages.

Office Action for Chinese Patent Application No. 201980023398.1 dated Nov. 2, 2022, 12 pages (includes English translation of Office Action).

* cited by examiner

MODAL CONDITIONER FOR USE WITH BEND-INSENSITIVE, MULTIMODE OPTICAL FIBERS

CROSS-REFERENCE TO RELATED APPLICATION

This application is a National Stage Application of PCT/US2019/027235, filed on Apr. 12, 2019, which claims the benefit of U.S. Patent Application Ser. No. 62/657,393, filed on Apr. 13, 2018, the disclosures of which are incorporated herein by reference in their entireties. To the extent appropriate, a claim of priority is made to each of the above disclosed applications.

BACKGROUND OF THE INVENTION

The present invention is generally directed to optical communications, and more specifically to improved methods of characterizing multimode optical fiber connections.

Optical signals are transmitted along an optical fiber by injecting light from a light source, typically a semiconductor light emitting diode (LED) or semiconductor laser, into one end of an optical fiber. The light source and the optical fiber need to be in correct alignment so that as much light from the light source is coupled into the optical fiber. Optical fiber communications over distances less than about one kilometer are often carried by multimode fibers, i.e. optical fibers that support the propagation of light along more than one fiber mode. Some of the fiber modes, the lower-order modes, are predominantly located near the center of the fiber core and others, referred to as higher order modes, extend closer to the core-cladding interface. The modal power distribution, i.e. the distribution of the optical power, entering a fiber into the different fiber modes, is referred to as the "launch condition."

Optical fiber connectors are often characterized before use in the field, or after installation. Such a characterization can include a measurement of the optical loss experienced by an optical signal traversing the optical fiber. It is important to control the launch conditions in order that the attenuation measurements can be made consistently. If a light source and fiber can be aligned so that nearly all modes are excited, then the optical fiber is said to be overfilled and the connection attenuation measurements will show a high connection attenuation that is pessimistic with respect to a typical practical installation. If, on the other hand, the launch condition is such that a smaller number of modes are excited, then the optical fiber will be underfilled and the attenuation measurements may show a much lower attenuation, which may lead to an underestimate of attenuation in a practical installation. Therefore, controlling the launch conditions so that only a desired combination of modes is excited results in repeatable, consistent testing of multimode optical fibers.

One approach to normalizing the launch condition for an optical test signal into a multimode fiber is the "encircled flux" ("EF") approach, where the profile of the light launched into the multimode fiber is well-defined. The EF approach was developed for conventional multimode fibers.

Bend-insensitive (BI) multi-mode optical fibers, however, are recently becoming more widely used. BI fiber uses additional features in the refractive index profile to reflect leaky modes back into the fiber and typically support more higher order modes than conventional fibers. Because of this, however, BI fibers are less amenable to the approaches used with conventional multimode fibers to comply with current EF standards.

There is a need, therefore, to develop ways of producing sources that comply with EF standards, and that are suitable for use with BI fibers.

SUMMARY OF THE INVENTION

One embodiment of the invention is directed to a light source unit that includes a light source to generate an optical light signal and a conventional multimode optical fiber coupled to receive the optical light signal from the light source at a first end. A modal conditioner is arranged to condition the optical light signal propagating along different modes of the conventional multimode fiber. A first bend-insensitive (BI) multimode optical fiber has an input end, the input end of the first BI multimode optical fiber being coupled at a second end of the conventional multimode optical fiber to receive the conditioned optical light signal from the conventional multimode fiber. There is an output from the first BI multimode optical fiber.

In some embodiments, the optical light signal at the output from the first BI multimode optical fiber is compliant with the ISO/IEC 14763 standard.

In some embodiments at least a portion of the conventional multimode optical fiber comprises a step-index fiber.

In other embodiments, the conventional multimode optical fiber comprises a first fiber portion coupled to a second fiber portion, the first fiber portion comprising a step-index multimode optical fiber and the second fiber portion comprising a graded-index multimode optical fiber. The optical light signal from the light source enters the first end at the first fiber portion of the conventional multimode fiber. The modal conditioner is arranged to condition the optical light signal propagating along different modes of the second fiber portion.

Other embodiments include method of measuring attenuation in a second BI multimode fiber. The method includes coupling the output of the light source unit described above to a first end of the second BI multimode fiber, and coupling an optical signal detector to a second end of the second BI multimode fiber. The optical light signal at the second end of the second BI multimode fiber is detected.

The above summary of the present invention is not intended to describe each illustrated embodiment or every implementation of the present invention. The figures and the detailed description which follow more particularly exemplify these embodiments.

BRIEF DESCRIPTION OF THE DRAWINGS

The invention may be more completely understood in consideration of the following detailed description of various embodiments of the invention in connection with the accompanying drawings, in which.

Figure 1A:
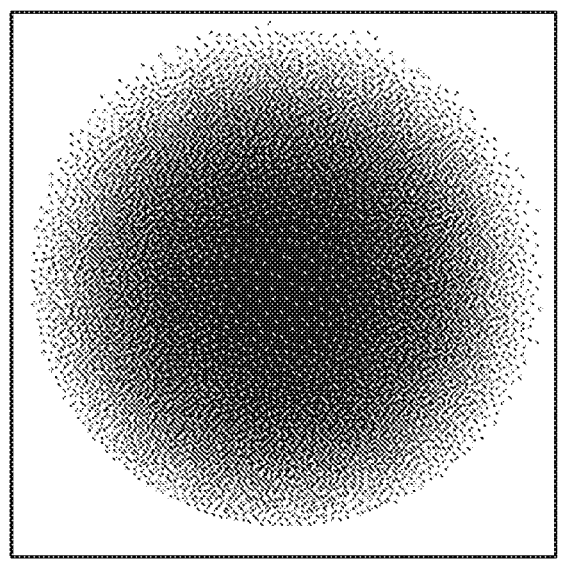
FIG. 1A schematically illustrates an azimuthally symmetric near-field light intensity pattern from a light source that is EF compliant in inverse color (a darker region indicates a brighter region)

While the invention is amenable to various modifications and alternative forms, specifics thereof have been shown by way of example in the drawings and will be described in detail. It should be understood, however, that the intention is not to limit the invention to the particular embodiments described. On the contrary, the intention is to cover all modifications, equivalents, and alternatives falling within the spirit and scope of the invention as defined by the appended claims.

DETAILED DESCRIPTION

The present invention is directed to providing a method of standardizing connection attenuation measurements made on bend-insensitive (BI) multimode optical fibers.

Encircled Flux ("EF") is a normalized cumulative near-field measurement used to characterize the launch conditions of a light source exciting modes in a multi-mode optical fiber. EF is defined through the integral of the axi-symmetric intensity distribution within the fiber over the radius of the fiber, setting limits for the optical power included within a specified radius of the fiber core, with definitive sets of radial power profiles at various wavelengths, e.g. 850 nm and 1300 nm. That way, EF describes targets and bounds on the intensity of the light within a fiber core. Thus, EF will vary with changes in light source, optical fiber, or how the light source is coupled with the optical fiber, i.e. the launch conditions.

In an attempt to provide industry with guidance on how to make fiber connection attenuation measurements consistently, a number of different organizations have produced standards, e.g. the Fiber Optic Association's (FOA's) FOA-1 standard, the Telecommunications Industry Association's (TIA's) OFSTP-14 standard, and the ISO/IEC 14763 standard.

Figure 1B:
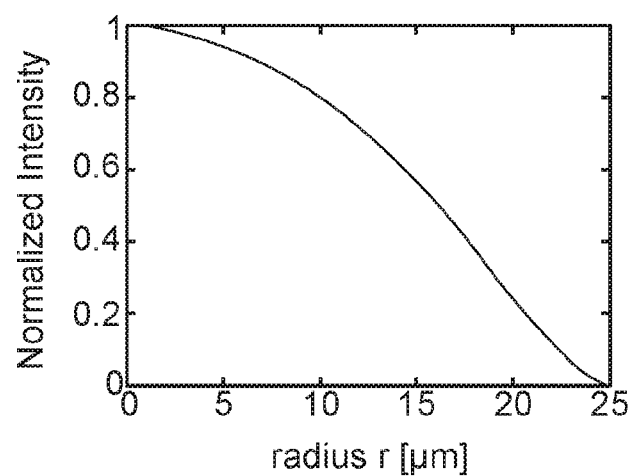
FIG. 1B shows the radial intensity distribution as set forth in the ISO/IEC 14763 standard.
Figure 1C:
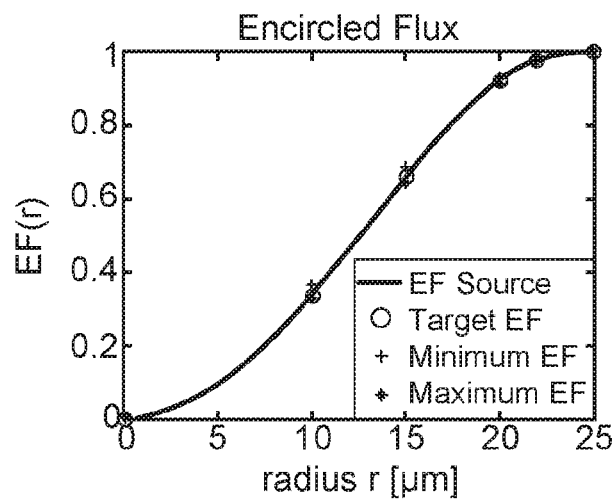
FIG. 1C shows the prescribed minimum and maximum values of the normalized cumulative radial intensity distribution standardized as EF required to comply with the ISO/IEC 14763 standard.

FIGS. 1A-1C provide the definition of EF according to the ISO/IEC 14763 standard. FIG. 1A shows an azimuthally symmetric near-field light intensity pattern from a light source that is EF compliant, according to the expression:

$$EF(r) = \frac{\int_0^r I(r')r' \, dr'}{\int_0^\infty I(r')r' \, dr'} \tag{1}$$

FIG. 1B shows the intensity distribution according to (1), while FIG. 1C shows the prescribed minimum and maximum values of EF.

Different approaches have been followed for satisfying the EF requirements of these standards for use with conventional fibers. One approach is to use a mode-scrambler, followed by a gap-type mode filter which introduces losses in the higher order modes. Another approach is to use mandrel wrapping, which involves tightly wrapping the multi-mode fiber around a mandrel. The tight bends increase the loss for higher order modes, and so a multi-mode fiber illuminated with light from an LED, which normally excites all modes in an equal manner, can produce an output satisfying the EF requirements after losing a portion of the energy in the higher order modes. Another approach is to transversely deform a fiber held substantially linearly, for example by deforming the fiber using a screw: the amount of deformation is adjusted via the position of the screw, which purportedly changes the EF of the light exiting the fiber.

Figure 2A:
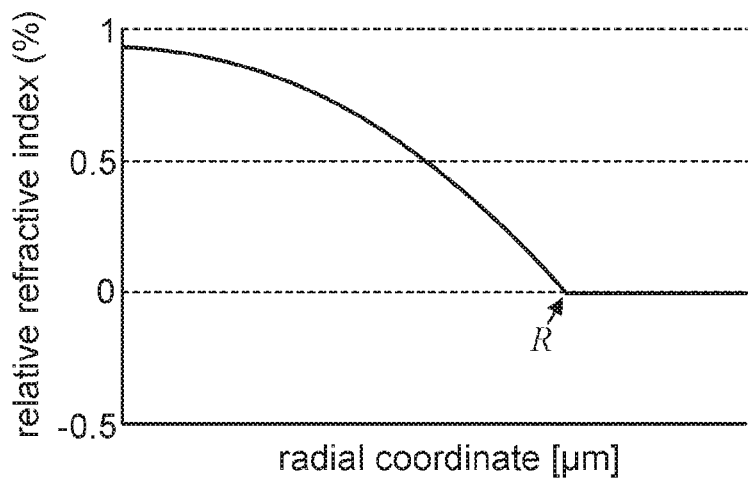
FIGS. 2A and 2B show exemplary refractive index profiles for conventional optical fibers.

Conventional multimode fibers typically have a parabolic refractive index profile, for example as illustrated in FIG. 2A, which shows the refractive index as a function of radial distance from the center of the fiber. This refractive index profile may also be referred to as a "graded-index" profile. The refractive index falls from the center of the fiber out to a radius, R, beyond which the refractive index is radially constant. That part of the fiber having a radius less than R is the fiber core, while that part of the fiber beyond R is the fiber cladding. The value of the refractive index at the center of the fiber core is of the order of 1% higher than the refractive index of the cladding.

Figure 2B:
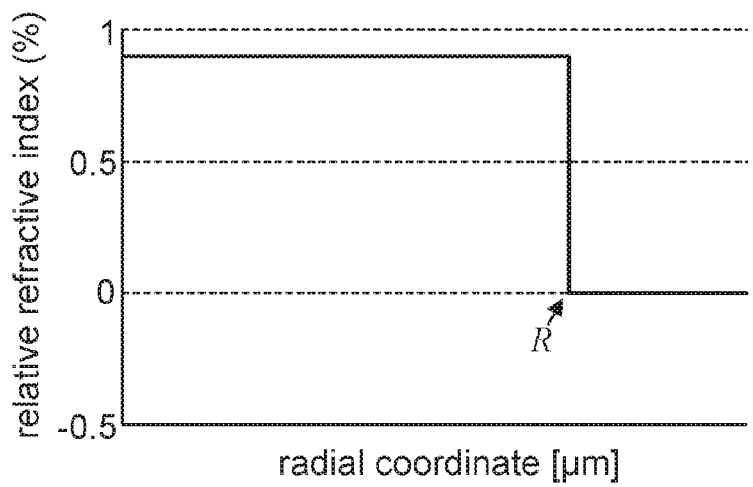

The refractive index profile of another type of conventional multimode fiber is schematically illustrated in FIG. 2B. In this profile, often referred to as a "step-index" profile, the refractive index is constant, or substantially so, from the center of the fiber out to the radius R, at which point it drops to a lower value. Like the graded-index fiber, the part of the step-index fiber having a radius less than R is the fiber core, while that part of the fiber beyond R is the cladding.

Bend-insensitive (BI) multi-mode optical fibers have recently become popular for use as patchcords and running cables inside tight buildings where tight bends may be needed. BI fiber uses additional features in the refractive index profile to reflect leaky, higher order, modes back into the fiber. Thus, BI fibers typically support more higher order modes than conventional fibers, e.g. graded-index fibers having a refractive index profile of the type illustrated in FIG. 2A. Moreover, BI fibers typically do not respond as well to mode-filtering by mandrel wrapping filtering in the same way as conventional multi-mode fibers. Thus, BI fibers cannot simply be manipulated in the same manner as conventional fibers in order to produce outputs that satisfy the EF standards discussed above.

Figure 2C:
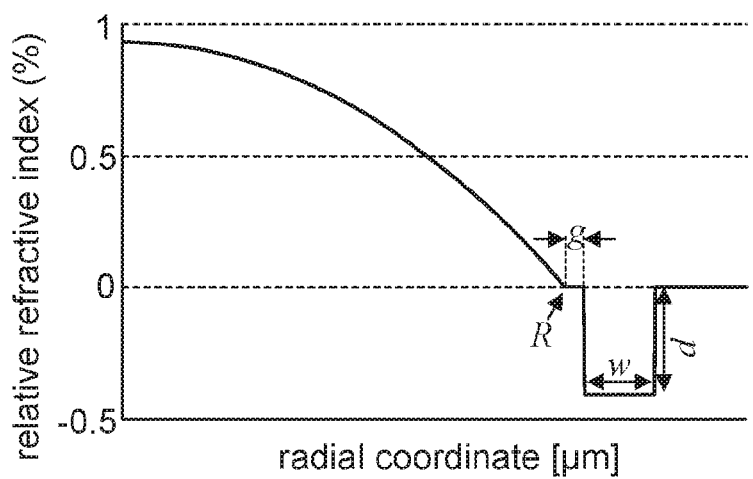
FIG. 2C shows an exemplary refractive index profile for a bend-insensitive optical fiber.

In a BI fiber, a portion of the fiber between the core and the cladding has a refractive index less than that of the cladding. FIG. 2C schematically illustrates an exemplary refractive index profile for a BI fiber. The refractive index is highest at the center of the fiber and it falls for positions at an increasing radius until a radius, R. That portion of the fiber within the radius R is the fiber core. At the radius R, the refractive index is constant for a gap distance g, after which there is a reduction in the refractive index between R+g and R+g+w, referred to herein as a "trench." The reduction in refractive index in the trench is shown in the figure as essentially a well with infinitely steep sides, so that the flat bottom of the well has a radial width of about w. It will be appreciated that the sides of the trench may have a slope whose amplitude is lower than that in the figure, so that the flat bottom of the well has a radial width less than w, or the trench may not even have a flat bottom, but one that is, for example, curved or V-shaped.

Figure 3:
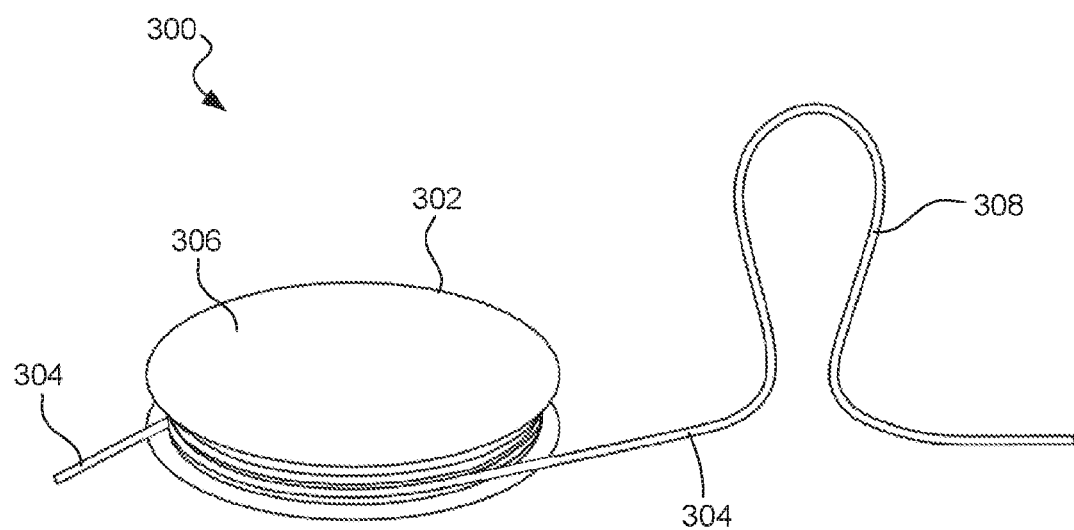
FIG. 3 schematically illustrates an approach to modal conditioning in a multimode fiber a mandrel wrap and an adjustable loop.

Conventional multimode fibers are commonly used in combination with some kind of modal conditioning device to distribute light among the modes within the fiber to satisfy EF standards. One approach is to wind the fiber around a mandrel, for example as discussed in U.S. Patent Publication No. 2016/0202418 A1, the disclosure of which is incorporated herein by reference. One example of a mandrel-wound system is schematically illustrated in FIG. 3, which shows a modal conditioning device 300 that includes a mandrel wrapping 302 having a predetermined number of turns of a multimode fiber 304 around a mandrel 306. In some embodiments, the mandrel wrapping 302 is sufficient to achieve the EF requirements set by an international standard. In another approach, the fiber 302 is also provided with an adjustable loop 308, which can be affixed to the side of the mandrel 306. The size and radius of the loop 308 can be adjusted to alter the modal distribution of light in the fiber 304 and thus affect the distribution of light within the fiber 304. The adjustable fiber loop 308, therefore, can be adjusted to satisfy the EF standard.

When light is coupled to the multimode fiber 304 the light may, depending on various factors, result in the fiber 304 being underfilled or overfilled, relative to the EF standardized target. The device 300 is preferably employed with conventional multimode fibers for conditioning light in a fiber that is overfilled. If the launch condition is underfilled, however, a mode scrambler, e.g. implemented as a section of step-index fiber, may be added upstream of the device 300. In another embodiment, such a mode scrambler may be incorporated as part of the device 300.

Figure 4:
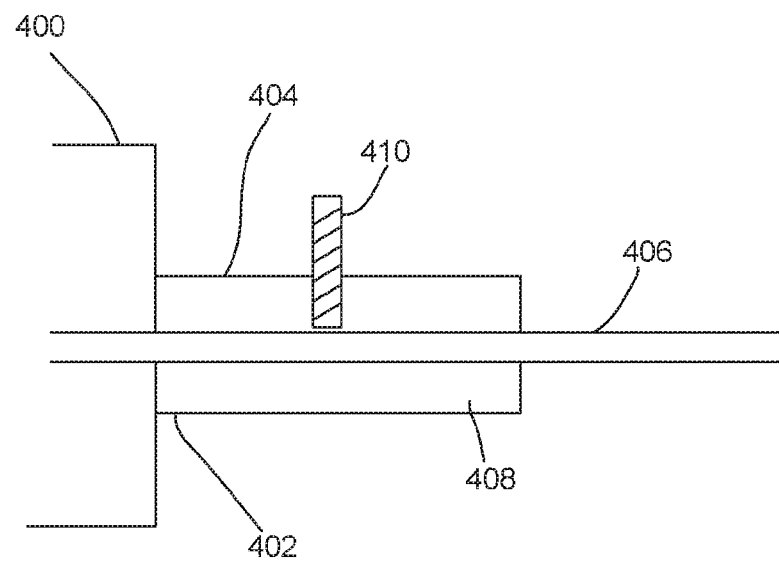
FIG. 4 schematically illustrates an approach to modal conditioning using a transverse-force modal conditioner.

Another approach to mode conditioning in a conventional multimode fiber is described in U.S. Patent Publication No. 2011/0096563 A1, the disclosure of which is incorporated herein by reference. In this approach, the modal conditioning device 400 includes a fiber optic light module 400 that has an output port 402 that includes a substantially hollow casing 404, see FIG. 4. An optical fiber 406 passes through the casing 404 which may support the optical fiber 406 at both ends of the casing 404. The casing 404 may be dimensioned to align the optical fiber 406 at both ends thereof and to allow the optical fiber 406 to be deformed within the space 408 of the casing 404. A screw 410 is threaded through the casing 404 such that it is in contact with the fiber 406. The screw 410 contacts the optical fiber 406 and exerts pressure upon it when the screw 410 is advanced in order to deform the fiber 406. This deformation of the fiber 406 results in a change in the EF of the light passing through the fiber. This type of modal conditioner may be referred to as a transverse-force modal conditioner.

Figure 5:
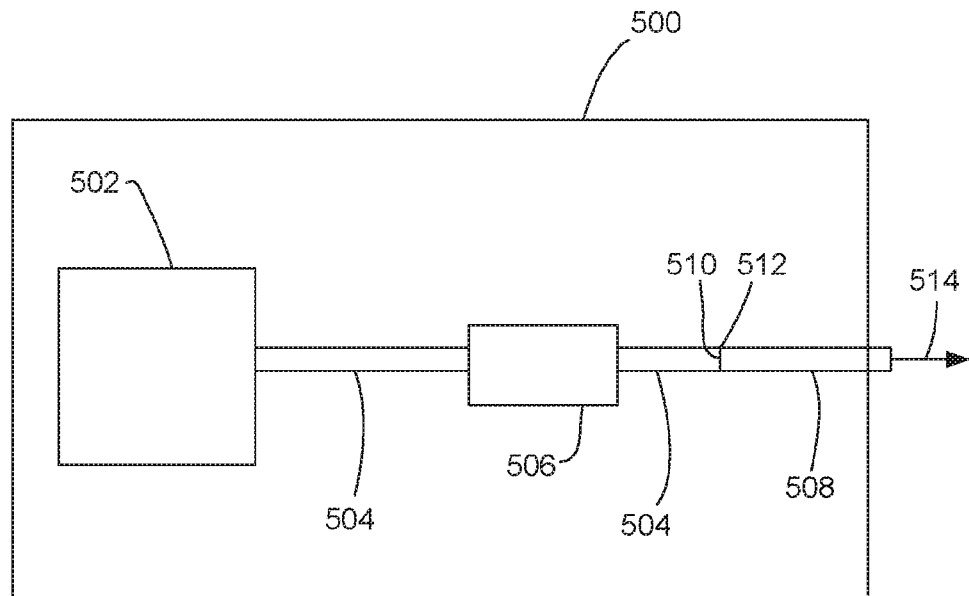
FIG. 5 schematically illustrates an embodiment of an EF standard-compliant light source having a bend-insensitive optical fiber output, according to an embodiment of the present invention.

Simply replacing the conventional fiber in these devices with a BI fiber will not produce an effective light source with controllable EF, since these devices rely on bending the fiber and BI fibers inherently resist modal conditioning arising from by bending. Accordingly, the present invention is directed to a BI light source that meets EF standards. One embodiment of the invention is schematically illustrated in FIG. 5. A BI light source 500 employs a light source 502, for example an LED or laser, such as a semiconductor laser, that is coupled to a conventional multimode fiber 504. If the light source 502 is a semiconductor laser, the laser may be a vertical cavity surface emitting laser (VCSEL) or an end-emitting waveguide semiconductor laser.

The conventional multimode fiber 504 is coupled to a modal conditioning device 506, such as a mandrel wrap or screw-type modal conditioner, or a combination of various modal conditioning devices. A BI multimode fiber 508 is coupled to the end 510 of the conventional fiber 504, for example via a fusion splice 512. Since the modes in the conventional multimode fiber 504 do not correspond one-to-one with the modes in the BI multimode fiber 508, there is no guarantee that the light output by the BI multimode fiber 508 is EF compliant if the light output from the conventional multimode fiber 504 is EF compliant. Instead, the distribution of light in the conventional fiber 504 is adjusted by the modal conditioning device 506 so that the light 514 output by the BI multimode fiber 508 is EF compliant. The EF-compliant output 514 can then be used for testing connection attenuation of BI fiber networks.

An advantage of this approach is that the output from the BI multimode fiber 508 can be made to comply with the EF standards without taking specific measures to match the diameters of the cores of the conventional and BI fibers. The different fibers have different core diameters with tolerances specified according to their appropriate fiber standards. In the case of multimode fibers, both conventional and BI fibers are specified in the IEC 60793-2-10 standard as A1a (50/125 µm core/cladding diameter graded index fiber).

In some embodiments, the fiber 504 may comprise a single length of graded-index multimode fiber. In other embodiments, the fiber 504 may include a length of step-index fiber followed by a length of graded-index fiber. The first length of step-index fiber permits the achievement of a uniform light distribution regardless of the type of light source used, typically LED or laser. The step-index fiber may be spliced to the graded-index fiber, resulting in the graded-index fiber that is generally overfilled, regardless of the type of light source used. The graded index fiber is then subject to mode conditioning to tune the output 514 from the BI fiber to that target EF. In other embodiments, the fiber 504 may be a step-index fiber.

Figure 6:
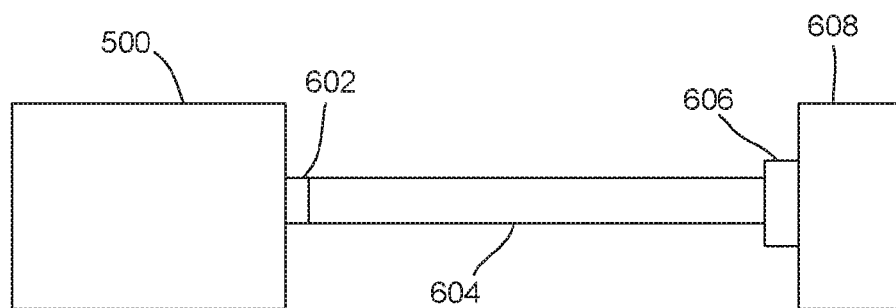
FIG. 6 schematically illustrates an approach to using the EF standard-compliant light source to measure transmission losses in a bend-insensitive multimode optical fiber.

One approach to using the BI light source 500 is schematically illustrated in FIG. 6. The BI light source 500 is coupled via a fiber coupler 602 to a first location of a BI fiber network 604 that is to be tested. The first location of the BI fiber network 604 may be at an end of the BI fiber network 604, for example at a location of an optical signal generator, or at some intermediate location of the network. In some embodiments, the BI fiber network 604 may include a single BI fiber. A second location of the BI fiber network 604 is coupled, via another fiber coupler 606, to an optical signal detector 608 that measures the amount of light transmitted through the fiber network 604 between the first and second locations. The second location of the BI fiber network 604 may be at an end of the network, for example at the location of an optical signal receiver, or may be at some intermediate location. The optical signal detector 608 may also be used to measure the amount of light produced by the BI light source 500, and so the overall losses of transmitting light through the BI fiber network 604 may be calculated.

Various modifications, equivalent processes, as well as numerous structures to which the present invention may be applicable will be readily apparent to those of skill in the art to which the present invention is directed upon review of the present specification. The claims are intended to cover such modifications and devices.

As noted above, the present invention is applicable to fiber optical communication and data transmission systems. Accordingly, the present invention should not be considered limited to the particular examples described above, but rather should be understood to cover all aspects of the invention as fairly set out in the attached claims.

The invention claimed is:

1. A test light source unit for testing a fiber, comprising:
a light source to generate an optical light signal;
a non-bend-insensitive multimode optical fiber coupled to receive the optical light signal from the light source at a first end;
a modal conditioner arranged to condition the optical light signal propagating along different modes of the non-bend-insensitive multimode fiber; and
a first bend-insensitive (BI) multimode optical fiber, an input end of the first BI multimode optical fiber being coupled at a second end of the non-bend-insensitive multimode optical fiber to receive the conditioned optical light signal from the non-bend-insensitive multimode fiber; and
an output from the first BI multimode optical fiber.

2. A light source unit as recited in claim 1, wherein the light source comprises one of a light emitting diode and a semiconductor laser.

3. A light source unit as recited in claim 2, wherein the semiconductor laser is a vertical cavity, surface emitting laser (VCSEL).

4. A light source unit as recited in claim 1, wherein the optical light signal at the output from the first BI multimode optical fiber is compliant with the ISO/IEC 14763 standard.

5. A light source unit as recited in claim 1, wherein the modal conditioner comprises a mandrel wrap.

6. A light source unit as recited in claim 5, further comprising an adjustable fiber loop.

7. A light source unit as recited in claim 1, wherein the modal conditioner comprises a transverse-force modal conditioner.

8. A light source unit as recited in claim 1, wherein at least a portion of the non-bend-insensitive multimode optical fiber comprises a step-index fiber.

9. A light source as recited in claim 1, wherein the non-bend-insensitive multimode optical fiber comprises a first fiber portion coupled to a second fiber portion, the first fiber portion comprising a step-index multimode optical fiber and the second fiber portion comprising a graded-index multimode optical fiber, wherein the optical light signal from the light source enters the first fiber portion of the non-bend-insensitive multimode fiber at the first end and the modal conditioner is arranged to condition the optical light signal propagating along different modes of the second fiber portion.

10. A method of measuring attenuation in a BI fiber network, comprising:
coupling the output of the light source unit of claim 1 to a first location of the BI fiber network;
coupling an optical signal detector to a second location of the BI fiber network; and detecting the optical light signal at the second location of the BI fiber network.

11. A light source as recited in claim 1, wherein the modal conditioner is disposed on the non-bend-insensitive multimode optical fiber, between the first and second ends of the non-bend-insensitive multimode optical fiber, to condition the optical light signal propagating along different modes of the non-bend-insensitive multimode fiber.

12. A light source as recited in claim 1, wherein the output of the first BI optical fiber is connected to an input of a second BI multimode optical fiber.

13. A method of testing a first bend-insensitive (BI) multimode optical fiber, comprising:
propagating a light beam from a light source into a first non-BI multimode optical fiber;
conditioning the light beam as it propagates along the first non-BI multimode optical fiber;
passing the light beam from the first non-BI multimode optical fiber into a second BI multimode optical fiber; and
outputting light from the second BI multimode fiber into the first BI multimode optical fiber.

14. A method as recited in claim 13, wherein the light output from the second BI multimode optical fiber to the first BI multimode optical fiber is compliant with ISO/IEC 14763 as a result of conditioning the light beam as it propagates along the non BI multimode optical fiber.

15. A method as recited in claim 13, further comprising detecting the light beam after passing through the first BI multimode optical fiber.

* * * * *